United States Patent
Elfeky et al.

(10) Patent No.: US 10,150,561 B2
(45) Date of Patent: Dec. 11, 2018

(54) SYSTEM AND METHOD OF OPERATION OF TWIN-TILTROTOR HELICOPTER

(71) Applicant: KING FAHD UNIVERSITY OF PETROLEUM AND MINERALS, Dhahran (SA)

(72) Inventors: Mahmoud Abdelmagid Elfeky, Dhahran (SA); Moustafa Elshafei Ahmed Elshafei, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 157 days.

(21) Appl. No.: 15/011,733

(22) Filed: Feb. 1, 2016

(65) Prior Publication Data

US 2017/0217584 A1  Aug. 3, 2017

(51) Int. Cl.
| | |
|---|---|
| *B64C 29/00* | (2006.01) |
| *B64C 27/56* | (2006.01) |
| *B64C 27/57* | (2006.01) |
| *G05D 1/00* | (2006.01) |
| *G05D 1/08* | (2006.01) |

(52) U.S. Cl.
CPC .......... *B64C 29/0033* (2013.01); *B64C 27/56* (2013.01); *B64C 27/57* (2013.01); *G05D 1/0072* (2013.01); *G05D 1/0858* (2013.01); *B64C 2201/108* (2013.01); *B64C 2201/146* (2013.01)

(58) Field of Classification Search
CPC ... B64C 2201/146; B64C 27/54; B64C 27/56; B64C 27/57; B64C 29/0033; G05G 9/04737; G05G 9/047; H01H 25/04; H01H 25/006; H01H 25/008

See application file for complete search history.

(56) References Cited

U.S. PATENT DOCUMENTS

| | | | | |
|---|---|---|---|---|
| 4,491,325 | A * | 1/1985 | Bersheim | A63F 13/06 200/6 A |
| 5,532,529 | A * | 7/1996 | Codina | G05G 9/047 200/1 A |
| 5,559,432 | A * | 9/1996 | Logue | B82Y 15/00 244/234 |
| 5,589,828 | A * | 12/1996 | Armstrong | G05G 9/04737 200/6 A |
| 5,790,101 | A * | 8/1998 | Schoch | G05G 9/047 345/161 |

(Continued)

OTHER PUBLICATIONS

Article Hub, "Aerospace Engineering", URL: http://article-hub.blogspot.in/2011/03/aerospace-engineering.html, Total 11 Pages, (Mar. 2011).

*Primary Examiner* — Medhat Badawi
(74) *Attorney, Agent, or Firm* — Oblon, McClelland, Maier & Neustadt, L.L.P.

(57) ABSTRACT

An air vehicle includes a flight computer, a fuselage, and two rotors mounted symmetrically with respect to the fuselage. Each of the two rotors includes a servo mechanism to tilt a respective rotor of the two rotors about two axes of the respective rotor. The flight computer is configured to send control parameters to each of the two rotors, the control parameters including a rotational speed, a first tilt angle about a first axis of the two axes of the respective rotor, and a second tilt angle about a second axis of the two axes of the respective rotor. A method for operating the air vehicle is also provided.

9 Claims, 11 Drawing Sheets

(56) References Cited

U.S. PATENT DOCUMENTS

| | | | | |
|---|---|---|---|---|
| 5,854,622 A * | 12/1998 | Brannon | G05G 9/04737 | 345/161 |
| 6,154,198 A * | 11/2000 | Rosenberg | A63F 13/06 | 345/156 |
| 6,160,537 A * | 12/2000 | Liu | G05G 1/06 | 250/221 |
| 6,232,959 B1 * | 5/2001 | Pedersen | G06F 1/1616 | 345/161 |
| 6,373,466 B2 * | 4/2002 | Salcudean | G05G 9/047 | 250/208.6 |
| 6,719,244 B1 | 4/2004 | Gress | | |
| 6,741,233 B1 * | 5/2004 | Swan | A63F 13/06 | 345/156 |
| 6,892,980 B2 * | 5/2005 | Kawai | B64C 11/001 | 244/12.4 |
| 7,236,914 B1 * | 6/2007 | Zyskowski | G06F 17/5009 | 434/30 |
| 7,236,941 B2 * | 6/2007 | Conkwright | G06Q 30/02 | 705/7.29 |
| 7,463,241 B2 * | 12/2008 | Ushimaru | G05G 9/04796 | 345/156 |
| 7,959,104 B2 | 6/2011 | Kuntz | | |
| 8,128,033 B2 * | 3/2012 | Raposo | A63H 23/00 | 244/171.2 |
| 8,874,283 B1 * | 10/2014 | Cavote | B64D 47/08 | 701/11 |
| 8,960,591 B2 * | 2/2015 | Pancotti | B64C 29/0033 | 244/56 |
| 9,616,998 B2 * | 4/2017 | Oakley | B64C 39/024 | |
| 2002/0190948 A1 * | 12/2002 | Coutant | G05G 9/047 | 345/161 |
| 2004/0003985 A1 * | 1/2004 | Nishimoto | G05G 9/04792 | 200/6 A |
| 2005/0162389 A1 * | 7/2005 | Obermeyer | G05G 9/047 | 345/161 |
| 2006/0137931 A1 * | 6/2006 | Berg | B62D 1/12 | 180/333 |
| 2007/0023581 A1 * | 2/2007 | La | B64C 27/20 | 244/165 |
| 2008/0278448 A1 * | 11/2008 | Nilsagard | G05G 9/053 | 345/161 |
| 2010/0301168 A1 * | 12/2010 | Raposo | A63H 23/00 | 244/171.2 |
| 2013/0145404 A1 * | 6/2013 | Ohayon | H04N 21/2187 | 725/62 |
| 2015/0353192 A1 * | 12/2015 | Morrison | B64C 27/08 | 244/17.23 |
| 2016/0023755 A1 * | 1/2016 | Elshafei | G08G 5/025 | 244/17.13 |

* cited by examiner

| Activated Control Parameter | | | | | | | |
|---|---|---|---|---|---|---|---|
| | Flight commands | $\alpha 1$ | $\alpha 2$ | $\beta 1$ | $\beta 2$ | F1 | F2 |
| 1 | Vertical motion | 0 | 0 | 0 | 0 | √ | √ |
| 2 | *Forward +x direction | 0 | 0 | +b | +b | - | - |
| 3 | *Backward −x direction | 0 | 0 | -b | -b | - | - |
| 4 | *Side motion +y | +a | +a | 0° | 0° | - | - |
| 5 | *Side motion -y | -a | -a | 0° | 0° | - | - |
| 6 | Yaw rotation CW | +a | -a | 0° | 0° | - | - |
| 7 | Yaw rotation CCW | -a | +a | 0° | 0° | - | - |
| 8 | Pitch + | 0° | 0° | +b | -b | - | - |
| 9 | Pitch - | 0° | 0° | -b | +b | - | - |
| 10 | Roll + | 0° | 0° | 0° | 0° | ↑ | ↓ |
| 11 | Roll - | 0° | 0° | 0° | 0° | ↓ | ↑ |

*FIG. 8C*

SYSTEM AND METHOD OF OPERATION OF TWIN-TILTROTOR HELICOPTER

BACKGROUND

Field of the Disclosure

This application relates a system and a method for control of a twin-tiltrotor helicopter. The twin-tiltrotor helicopter (TTH) is lifted and propelled by two rotors. Twin-tiltrotor helicopters are classified as a rotocraft, as opposed to a fixed-wing aircraft, since the twin-tiltrotor helicopters derive lift from the rotation of revolving airfoils.

Description of the Related Art

In conventional helicopters, the rotational speed of the main rotor is usually kept constant, while control of the helicopters' motion is achieved by altering the pitch of the blades. This position dependent pitch is referred to as 'cyclic' and the blade's pitch is based on the blade's position in the rotor disk. However, unlike a conventional helicopter, a multirotor helicopter employs fixed-pitch blades.

The control of a multirotor helicopter is achieved by varying the rotational speed of one or more rotors, thereby changing a torque load, thrust, and lift characteristics of the multirotor helicopter. By comparison, the drag on the blades of the main rotor in conventional helicopters cause the main body of the helicopter to rotate and a rear tail rotor is needed as a balancing moment to counter the drag-induced torque. However, the rear tail rotor of helicopters reduces flight efficiency and does not contribute to the lift force. The multirotor configuration eliminates the need for a rear tail rotor by employing counter-rotation of rotor pairs.

Multirotor helicopters also have additional advantages over conventional helicopters in that multirotor helicopter rotors do not require mechanical linkages to vary the rotor blade pitch angle as the rotor blade spins. This simplifies the design and maintenance of the multirotor helicopter.

More recently, the multirotor helicopter has become popular in unmanned aerial vehicle (UAV) research. These vehicles in related art may use electronic control systems and electronic sensors to help stabilize the aircraft. The multirotor helicopter may be sized compactly for agile maneuverability and can be flown both indoors and outdoors. The multirotor helicopter may be used as a UAV for surveillance and reconnaissance by military and law enforcement agencies, as well as for search and rescue missions in a wide array of environments and conditions, from urban to remote locations. The multirotor helicopter UAVs can be suitable for these tasks due to their autonomous capabilities and cost savings over other conventional methods.

The multirotor helicopters may also be employed in manned aerial vehicles and can be employed in a wide range of commercial and military applications. Such applications may include: heavy transportation, construction of bridges and buildings, assembly of large pieces in factories, and rescue operations after natural disasters where roads and bridges are no longer usable.

For military applications, the multirotor helicopter may perform vertical takeoff and landing (VTOL) and can be used in manned operations for effective transport and for military deployment operations in hostile environments where VTOL is a requirement. Additionally, the multirotor helicopter can have maneuverability that may be superior to helicopters, such as the APACHE helicopter.

The multirotor helicopter structure and control in the related art lacks the flexibility to meet the maneuverability and precision requirements needed for control and air vehicle management of manned multirotor helicopter rotors. Further, multirotor helicopters can be heavy leading to a sluggish or delayed response to a flight command and may require powerful motors to compensate for the rotor weight and slow flight dynamics. There remains a need for an improved, faster and lighter helicopter system and method to provide superior control and precision.

SUMMARY

According to an embodiment of the present disclosure, there is provided an air vehicle system. The air vehicle system includes a flight computer, a fuselage, and two rotors mounted symmetrically to the fuselage, each of the two rotors including servo mechanism to tilt each of the two rotors about two axes of each respective rotor. The flight computer is configured to send control parameters to each of the two rotors, the control parameters including a rotational speed, a first tilt angle about a first axis of the two axes of each respective rotor, and a second tilt angle about a second axis of the two axes of each respective rotor. The air vehicle further includes a control panel that receives flight commands executed by the flight computer to control the control parameters of the two rotors.

Further, according to an embodiment of the present disclosure, there is provided a method of operating an air vehicle having two rotors. The method includes steps for receiving flight commands via a control panel of the air vehicle, translating the flight commands into one or more control parameters for the two rotors, wherein the one or more control parameters includes a first tilt angle, about a first axis, for each of the two rotors and a second tilt angle, about a second axis, for each of the two rotors, producing translational motion commands and orientation commands, via a flight computer, based on a programmable flight mission. The method of operating the air vehicle further includes operating, in a first mode, a second mode, a third mode, and a fourth mode. In the first mode, operating each of the two rotors when no failures or damage is detected in any of the two rotors. In the second mode, operating the air vehicle when a failure or damage is detected in one of the two rotors. In the third mode, operating all two rotors to control angular speeds of each of the two rotors when servo systems for one of the two rotors fail, and operating to control tilt angles via servo systems of the rotor that have not failed. In the fourth mode, operating all two rotors to control angular speeds of the two rotors when the servo systems for all of the two rotors fail.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features.

The characteristics and advantages of exemplary embodiments are set out in more detail in the following description, made with reference to the accompanying drawings. In the drawings:

FIG. 8C depicts exemplary control parameters that are activated to control the twin-tilt rotor air vehicle according to an exemplary embodiment of the present disclosure.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

Furthermore, the terms "approximately," "proximate," "minor," and similar terms generally refer to ranges that include the identified value within a margin of 20%, 10% or preferably 5% in certain embodiments, and any values therebetween.

Figure 1A:
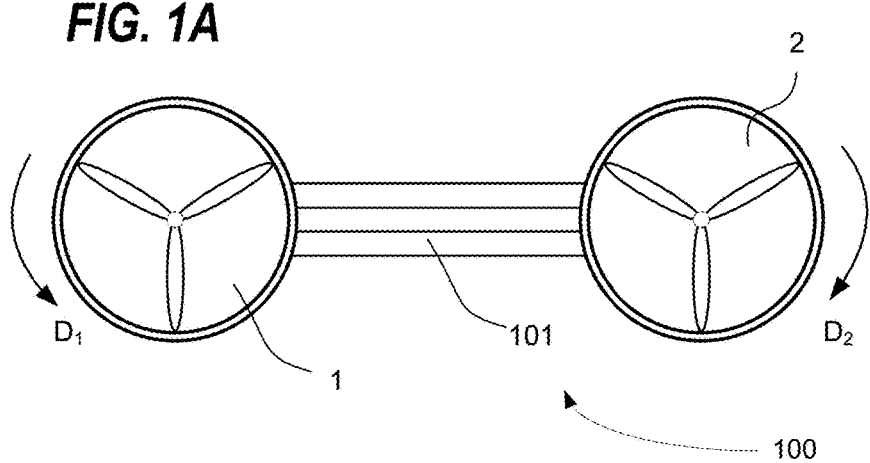
FIG. 1A depicts a top view of a twin-tilt rotor air vehicle according to an embodiment of the present disclosure.
Figure 1B:
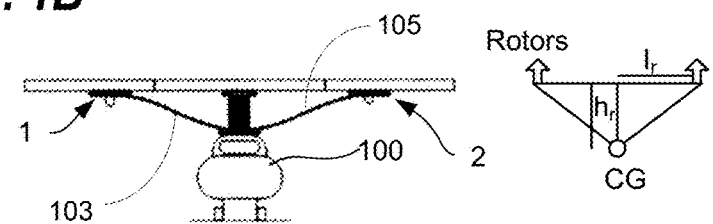
FIG. 1B depicts an elevation view of the twin-tilt rotor air vehicle according to an exemplary embodiment of the present disclosure.

According to one embodiment as shown in FIGS. 1A and 1B, an air vehicle 100 may comprise two rotors 1 and 2 mounted symmetrically on a fuselage 101. The fuselage 101 may be second to the air vehicle 100 by struts 103 and 105, which, as shown in FIG. 1B are mounted proximate to the rotors 1 and 2. Rotor 1 may rotate in a first direction $D_1$, while the rotor 2 may rotate in a second direction $D_2$. For example, rotor 1 may rotate in a counter-clockwise direction, while the rotor 2 may rotate in a clockwise direction. Alternatively, the rotor 1 may rotate in a clockwise direction, while the rotor 2 may rotate in a counter-clockwise direction.

In one embodiment, the angular speed of each of the rotors 1 and 2 may be controlled independently. The rotors 1 and 2 may be driven by brushless DC motors, or they may be driven by one or more fuel engines including speed control and rpm sensors. The thrust of each rotor 1 and 2 may be independently tilted in any direction within a hemisphere. Therefore, each rotor 1 and 2 includes three controllable parameters: the thrust $F_i$ and two tilt angles $\alpha_i$ and $\beta_i$, where the subscript i refers to rotor 1 or 2. As such, with two rotors 1 and 2 present, the air vehicle 100 may include a total of six independent control parameters. These parameters may enable full and precise control of the air vehicle 100 to allow for superior maneuverability that cannot be achieved in conventional aircrafts and helicopters.

The disk loading $P_D$ is defined as the ratio of helicopter weight to the total area swept by the rotors, $$P_D = \frac{W_g}{k\pi R^2},$$

where $W_g$ is the gross weight of the air vehicle, k is the number of rotors, and R is the radius of the blades swept area. For example, the disk loading of a Boeing Bell Osprey MV22B aircraft (twin rotor VTOL) is about 129 kgw/m$^2$, and is about 72 kgw/m$^2$ for a Sikorsky CH-53 helicopter. For twin-tilt rotor aircrafts, the rotors may be powered by high-speed brushless motors and their disk loading may range from 22.5 to 125 kgw/m$^2$, providing a power of 1.25 to 7 kW/m$^2$.

The induced air velocity of a rotor may be described as, $$v_i = \sqrt{\frac{T_i}{A}\frac{1}{2\rho}},$$

where $T_i$ is the lift thrust of a rotor i, A is the total area swept by the blades of a rotor, T/A is the disk loading as before in N/m$^2$, and $\rho$ is the density of air.

Using the induced air velocity $v_i$ the power $P_i$ required for hover (in an ideal case) is described as, $$P_i = T_i v_i = T_i \sqrt{\frac{T_i}{A}\frac{1}{2\rho}}$$

and the theoretical hover power/kg, $P_{ti}$ is $$P_{ti} = g\sqrt{\frac{T_i}{A}\frac{1}{2\rho}} = g\sqrt{\frac{P_{Di}}{2\rho}},$$

where, g is the gravitational constant 9.81 m/s$^2$.

For example, when disk loading is 50 kg, the power required is 140 watt/kg or 7 kW/m$^2$ of the rotor disk. It should be noted that the required power is inversely proportional to the radius of the rotor blade length.

Figure 1C:
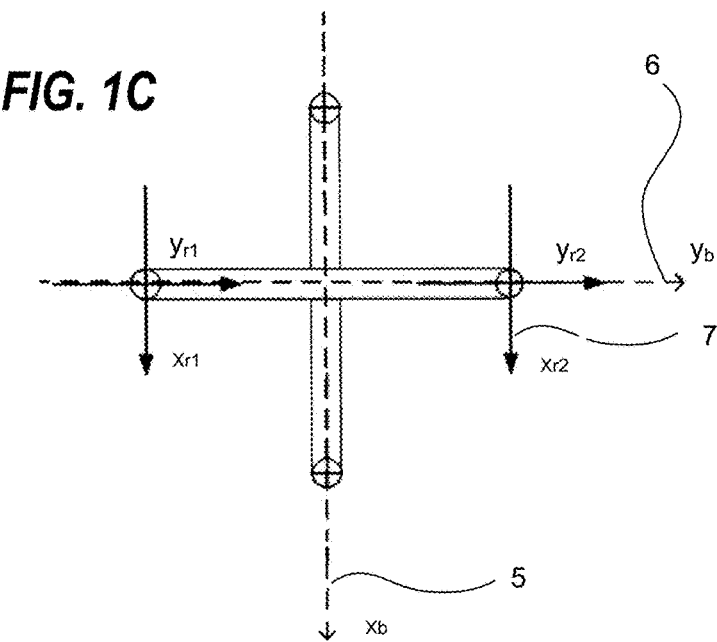
FIG. 1C depicts a vehicle body axis and a fixed reference axis of rotors of the twin-tilt rotor air vehicle according to an exemplary embodiment of the present disclosure.

Referring to FIG. 1C, directions of body reference axes of the vehicle are taken as follows, $x_b$ 5 is along a longitudinal axis of the vehicle, $y_b$ 6 is a left direction of the pilot, and $z_b$ (not shown) is pointing perpendicular to both $x_b$ and $y_b$. The rotors fixed reference axes are parallel to the body axis. Accordingly, reference axes $x_{ri}$ are parallel to $x_b$, and reference axes $y_{ri}$ are parallel to $y_b$. For example, the $x_{r2}$ 7 reference axis is parallel to $x_b$.

Figure 2A:
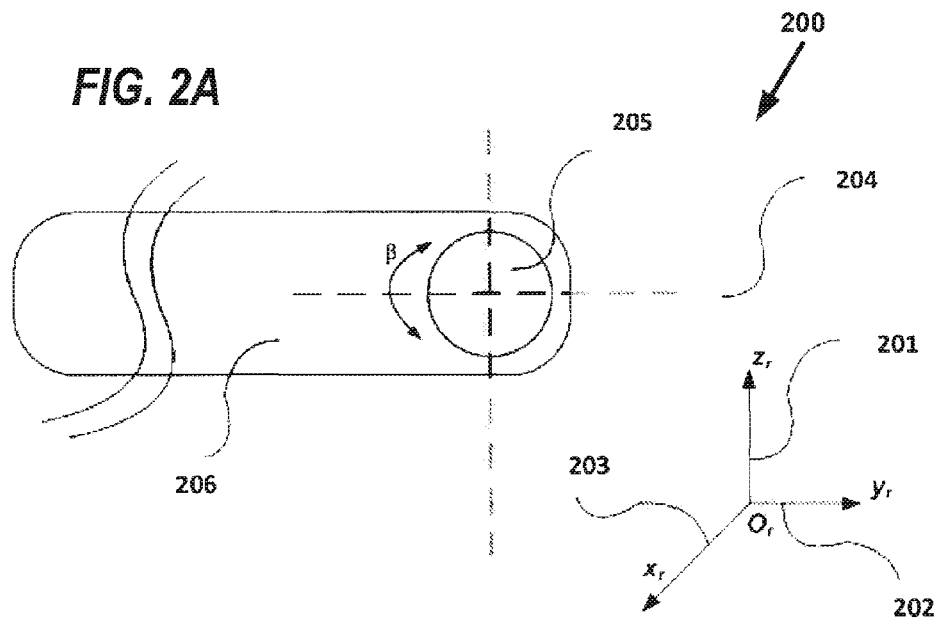
FIG. 2A depicts a top view of a mechanism for 3D tilting of rotors of the twin-tilt rotor air vehicle according to an exemplary embodiment of the present disclosure.
Figure 2B:
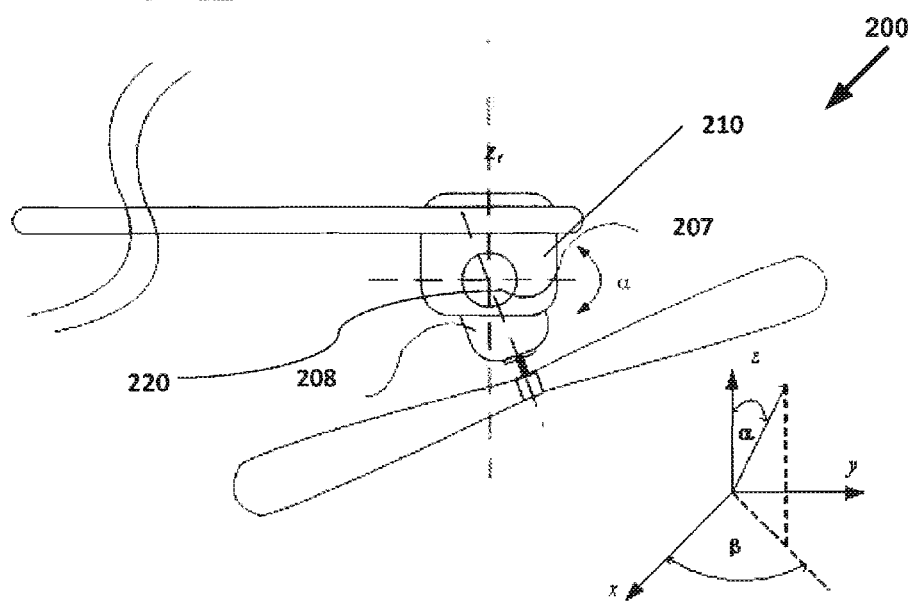
FIG. 2B depicts a side view of the mechanism for 3D tilting of rotors of the twin-tilt rotor air vehicle according to an exemplary embodiment of the present disclosure.

In one embodiment, one or more rotors of a twin-tiltrotor helicopter (TTH) may be provided with a tilting mechanism 200, as shown in FIGS. 2A and 2B. As shown in FIG. 2A, Oi is an origin of fixed axis at a rotor base 210. Axis $z_r$ 201, axis $y_r$ 202, and axis $x_r$ 203 are each parallel to a body axis of a rotor fixed frame 220. Each rotor may be tilted in two directions about two separate axes by rotation around the $z_r$ axis 201, and rotation about the $x_r$ axis 203. The tilting mechanism 200 consists of the two joints 205 and 207. The rotation of joint 205 may be limited to $\beta_{max}$, while rotation of joint 207 may be limited to $\alpha_{max}$. In one embodiment, $\beta_{max}$ may be within +/−90 degrees. In one embodiment, $\alpha_{max}$ may be between +/−20 degrees to +/−40 degrees. The rotation may be performed using standard hydraulic servos, or by electric servo motors. In one embodiment, standard hydraulic servos may be used in large vehicle applications, while electric servo motors may be used in small UAV applications.

The lifting thrust of a rotor is given by $$T = c_t A(\rho/2)(\omega R)^2 = b_i \omega^2$$

where $c_t$ is the thrust coefficient (0.008-0.012), A is the area swept by blades, $\omega$ is the angular velocity of the blades of the rotor, and $b_i$ is a thrust constant defined as $c_t A(\rho/2)R^2$. The $c_t$ depends on the shape of the blade and its pitch angle.

The blade moment $$M_r = c_d A(\rho/2)(\omega R)^2 R = d_m \omega^2$$

where $c_d$ is the drag coefficient (≈0.0006-0.0008), depending on the blade geometry and the pitch angle of the blade, and $d_m$ is a moment constant defined as $c_d A(\rho/2)R^3$.

The orientation of the rotor may be controlled by two rotations about the rotor fixed frame 220, $\alpha_i$, a rotation about the rotor $x_r$ axis 203, and $\beta_i$, a rotation about the rotor z axis 201, as shown in FIGS. 2A and 2B. The location of the center of gravity may not necessarily be on the same plane as the rotors, as shown in FIG. 2B. The rotor specific thrust may be a ratio of the thrust developed by the rotor to the drag power and is inversely proportional to $\omega_R$, the blade tip velocity.

In a conventional helicopter, high specific thrust can be obtained by using low rotor speed. The drag power increases by the tip velocity $\omega_R$ and the tip speed of conventional helicopters is limited to approximately 0.7-0.8 Mach, or approximately 240-270 m/sec. As an example, if the rotor tip speed is limited to 240 m/sec, and the rotor radius is 2 meters, then the rotor angular speed should be about 1146 rpm. This would result in a disk load of about 35 kg/m$^2$.

To find the forces and torques generated by each tilted rotor on the air vehicle, let $R_{ri}^{oi}$ be the rotational matrix of the rotor with respect to fixed axis at Oi. Since the axis at Oi are parallel to the body axis B at the center of gravity of the air vehicle, then $$R_{ri}^{oi} = R_{ri}^{B} = \begin{bmatrix} 0 & 0 & c\beta_i s\alpha_i \\ 0 & 0 & s\beta_i s\alpha_i \\ 0 & 0 & c\alpha_i \end{bmatrix}. \quad \text{(EQ. 1)}$$

where, $R_{ri}^{B}$ is the rotational matrix of the rotor with respect to the body axis at B, c is the cosine (of $\beta_i$, in EQ. 1), and s is the sine (of $\alpha_i$ in EQ. 1).

The thrust components $F_i$ of the ith rotor at the body center of gravity are then given by $$F_i = \begin{bmatrix} 0 & 0 & c\beta_i s\alpha_i \\ 0 & 0 & s\beta_i s\alpha_i \\ 0 & 0 & c\alpha_i \end{bmatrix} \begin{bmatrix} 0 \\ 0 \\ b_i \omega_i^2 \end{bmatrix}. \quad \text{(EQ. 2)}$$

Similarly the moments of a titled rotor consist of two parts, the drag moment, and the moments generated by the thrust components. These two components can be expressed as $$M_i = \begin{bmatrix} 0 & 0 & c\beta_i s\alpha_i \\ 0 & 0 & s\beta_i s\alpha_i \\ 0 & 0 & c\alpha_i \end{bmatrix} \begin{bmatrix} 0 \\ 0 \\ d\omega_i^2 \delta(i) \end{bmatrix} + r_i x F_i \quad \text{(EQ. 3)}$$

where $\delta=[1,-1]$, to account for the direction of rotation of each rotor, and where $$a x b = \begin{bmatrix} 0 & -a3 & a2 \\ a3 & 0 & -a1 \\ -a2 & a1 & 0 \end{bmatrix} \begin{bmatrix} b1 \\ b2 \\ b3 \end{bmatrix}.$$

$r_i$ is the vector from the center of gravity (CG) to the reference points of the $i^{th}$ rotor, i.e. $r_1=[0,l,-h]'$, $r_2=[0,-l,-h]'$, as shown in FIG. 1B. From EQ. 2, $$F_{ix} = C\beta_i S\alpha_i b_i \omega_i^2; \text{ for } i=1,2$$

$$F_{iy} = S\beta_i S\alpha_i b_i \omega_i^2$$

$$F_{iz} = C\alpha_i b_i \omega_i^2$$

Where forces $F_{ix}$, $F_{iy}$, and $F_{iz}$ are components of the force F along the x, y and z axis respectively. Once the forces and moments at the center of gravity are found, the derivation of the dynamic equations can easily be derived using standard techniques, for example, see the following:

$$m\begin{bmatrix} \ddot{x} \\ \ddot{y} \\ \ddot{z} \end{bmatrix} = R_{EB} \begin{bmatrix} 0 \\ 0 \\ -mg \end{bmatrix} - \begin{bmatrix} K_1 \dot{x} \\ K_2 \dot{y} \\ K_3 \dot{z} \end{bmatrix} + \sum_{i=1}^{2} F_i, \quad \text{(EQ. 4)}$$

where $R_{EB}$ is the inverse of the body Euler transformation matrix, and $K_1$, $K_2$, $K_3$ are air drag. Let, the rotation dynamics be represented in a standard form, in which the rotor speed f) can be expressed as a function of rate of change of roll pitch and yaw as follows, $$\Omega = [\dot{\phi}, \dot{\theta}, \dot{\psi}]^T,$$

the rotational dynamic equation can then be written as $$I\frac{d\Omega}{dt} = -(\Omega \times I\Omega) - M_G - M, \quad \text{(EQ. 5)}$$

where I is the moment of inertia matrix of the air vehicle. In the shown embodiment, there are two axes of symmetry which result in a simple moment of inertia matrix.

$M_G$ is the gyroscopic moment and M is the moment of the rotor, which are given by equations EQ. 6 and EQ. 8 respectively.

$$M_G = \sum_{i=1}^{2} I(\Omega \times \overline{\omega}_i)\delta(i), \quad \text{(EQ. 6)}$$

$$\overline{\omega}_i = \begin{bmatrix} 0 & 0 & c\beta_i s\alpha_i \\ 0 & 0 & s\beta_i s\alpha_i \\ 0 & 0 & c\alpha_i \end{bmatrix} \begin{bmatrix} 0 \\ 0 \\ \omega_i \end{bmatrix}, \text{ and} \quad \text{(EQ. 7)}$$

$$M = \sum_{i=1}^{2} M_i. \quad \text{(EQ. 8)}$$

The body transformation matrix $R_B^E$ with respect to the earth inertia frame E is given by $$R_B^E = R_\psi \cdot R_\theta \cdot R_\phi = \begin{bmatrix} c\psi & -s\psi & 0 \\ s\psi & c\psi & 0 \\ 0 & 0 & 1 \end{bmatrix} \begin{bmatrix} c\theta & 0 & s\theta \\ 0 & 1 & 0 \\ -s\theta & 0 & c\theta \end{bmatrix} \begin{bmatrix} 1 & 0 & 0 \\ 0 & c\phi & -s\phi \\ 0 & s\phi & c\phi \end{bmatrix},$$

where $\{\psi, \theta, \phi\}$ are the body yaw, pitch, and roll respectively, $$R_B^E = \begin{bmatrix} c\psi c\theta & -s\psi c\phi + c\psi s\theta s\phi & s\psi s\phi + c\psi s\theta c\phi \\ s\psi c\theta & c\psi c\phi + s\psi s\theta s\phi & -c\psi s\phi + s\psi s\theta c\phi \\ -s\theta & c\theta s\phi & c\theta c\phi \end{bmatrix}.$$

Equations EQ. 4 and EQ. 5 can be easily placed in the form of $$\dot{X} = f(X, U)$$

where $$X = [x, \dot{x}, y, \dot{y}, z, \dot{z}, \phi, \dot{\phi}, \theta, \dot{\theta}, \psi, \dot{\psi}]',$$

$$U = [\omega_1, \alpha_1, \beta_1, \omega_2, \alpha_2, \beta_2],$$

$$Y = [\ddot{x}_B, \ddot{y}_B, \ddot{z}_B, z, \dot{z}, \phi, \dot{\phi}, \theta, \dot{\theta}, \psi, \dot{\psi}]',$$

Where X is the state variable matrix of the air vehicle, U is the input matrix of the air vehicle, and Y is the measurement from the instrumentation system as discussed in the U.S. Pat. No. 8,260,477 to Al-Malki and Elshafei, and is hereby incorporated by reference.

Figure 3:
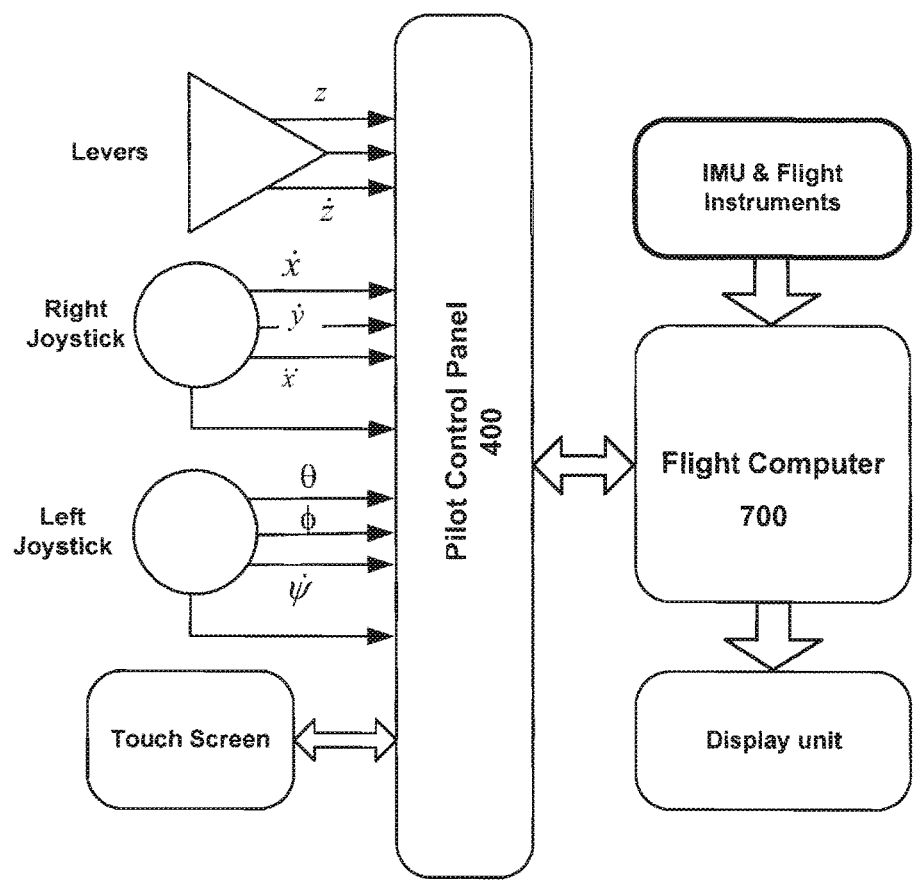
FIG. 3 depicts a block diagram of an input and output interface with a control panel according to an exemplary embodiment of the present disclosure.

During normal control of the air vehicle, a control panel may provide the operator with one or more of the following controls: forward speed $\dot{x}$ and acceleration $\ddot{x}$; lateral speed $\dot{y}$ and acceleration $\ddot{y}$; elevation z and ascending speed $\dot{z}$; pitch control θ; yaw control $\dot{\psi}$; and/or roll control φ, as illustrated in FIG. 3. An exemplary control panel is further illustrated in FIG. 4.

Figure 4:
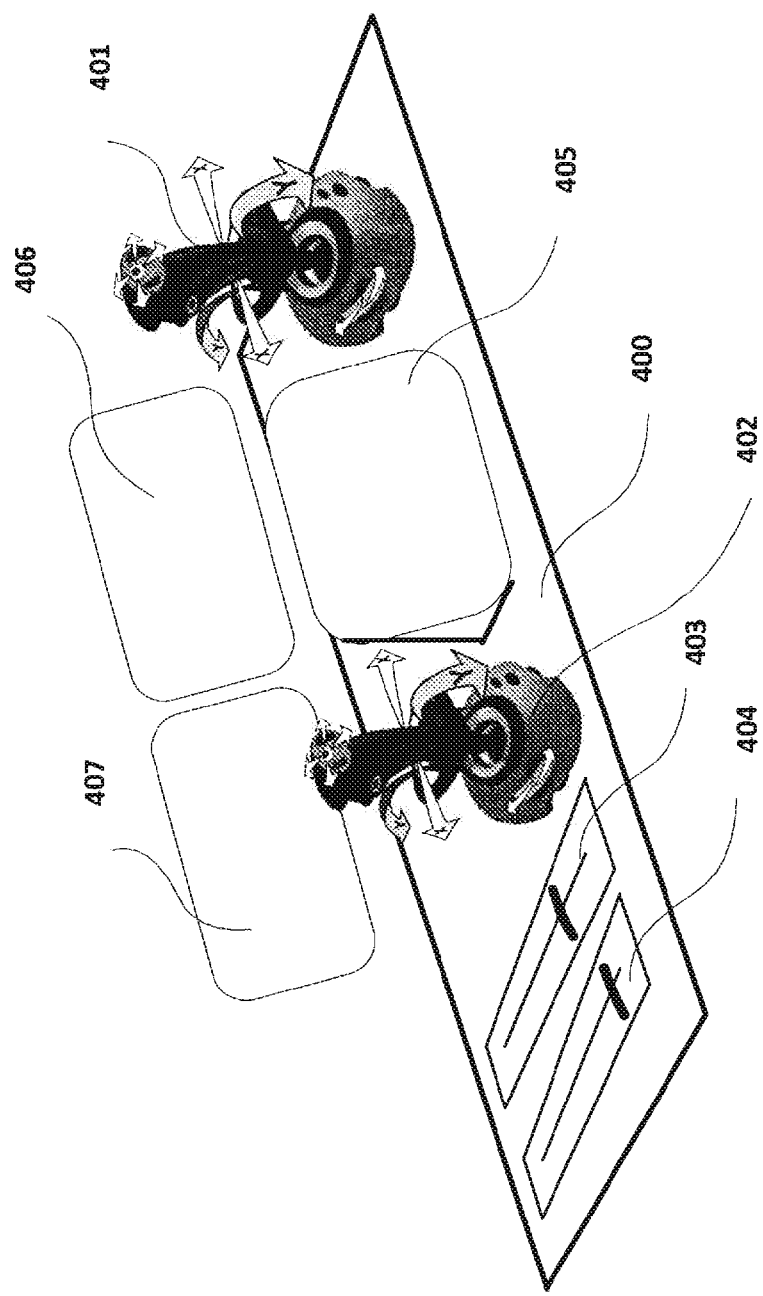
FIG. 4 depicts a perspective view of an exemplary air vehicle control panel according to an exemplary embodiment of the present disclosure.

In one embodiment as shown in FIG. 4, a pilot control panel 400 may be used by a pilot or operator to take advantage of the six possible control inputs. The pilot control panel 400 may include two 3-axis joysticks—a right joystick 401 and a left joystick 402, collective levers 403 and 404, a touch screen 405, and one or two display screens 406, 407.

In one embodiment, the right joystick 401 may be used by a pilot or an operator to control the forward speed by moving the joystick forward and backward, and lateral speed may be controlled by moving the right joystick 401 horizontally left and right, while the forward acceleration, or thrust, may be controlled by twisting the right joystick 401. The right joystick 401 may also be equipped with additional buttons to allow the pilot to choose from acceleration control or velocity control, and to activate forward cruise control. Alternatively, the pilot may activate acceleration control from the touch screen 405. In a forward speed control, a forward speed may be proportional to the right joystick 401 position. A neutral position of the right joystick 401 may cause the aircraft to come to a hover state. However, in high maneuverability situations, such as in the combat scenario, the pilot may switch the forward speed control to a forward acceleration control. In the forward acceleration control, a forward acceleration may be proportional to the position of the right joystick 401. The neutral position of the right joystick 401 may cause the aircraft to maintain its last forward speed. A soft switch on the touch screen 405 may enable the pilot to limit the actions of the joystick to the forward speed control only, reverse motion only, or both.

In one embodiment, the left joystick 402 may be used to control the rotational movements of the air vehicle. The forward/backward position may be used to control the pitch of the air vehicle, the left/right positions may be used to control the roll of the air vehicle, while twisting the left joystick 402 may control the yaw angular velocity. The control and functions of the right joystick 401 may be swapped with the left joystick 402, and vice versa. Alternatively, the right joystick 401, and the left joystick 402 may be customized to remap the different functions, described above, to different positions of the joysticks 401, 402, as desired by the pilot or operator.

In one embodiment, the position of an elevation lever 403 may be used to control the hover elevation of the air vehicle. A second lever 404 may be used to control the ascending speed $\dot{z}$, or thrust of the air vehicle.

In one embodiment, the touch screen 405 may display additional controls to set the desired roll rate, pitch rate, lateral motion acceleration, and various light control. A status screen 406 may display the elevation in meters, the forward velocity, the orientation of the air vehicle (roll, pitch, yaw), the total odometer reading, the trip kilometers, fuel/battery status, and/or GPS/GIS location information. The status screens 406 may also display the rpm of the two rotors, power consumption, and possible alarm status as motor temperature, overpower, or over speed, etc.

Figure 5:
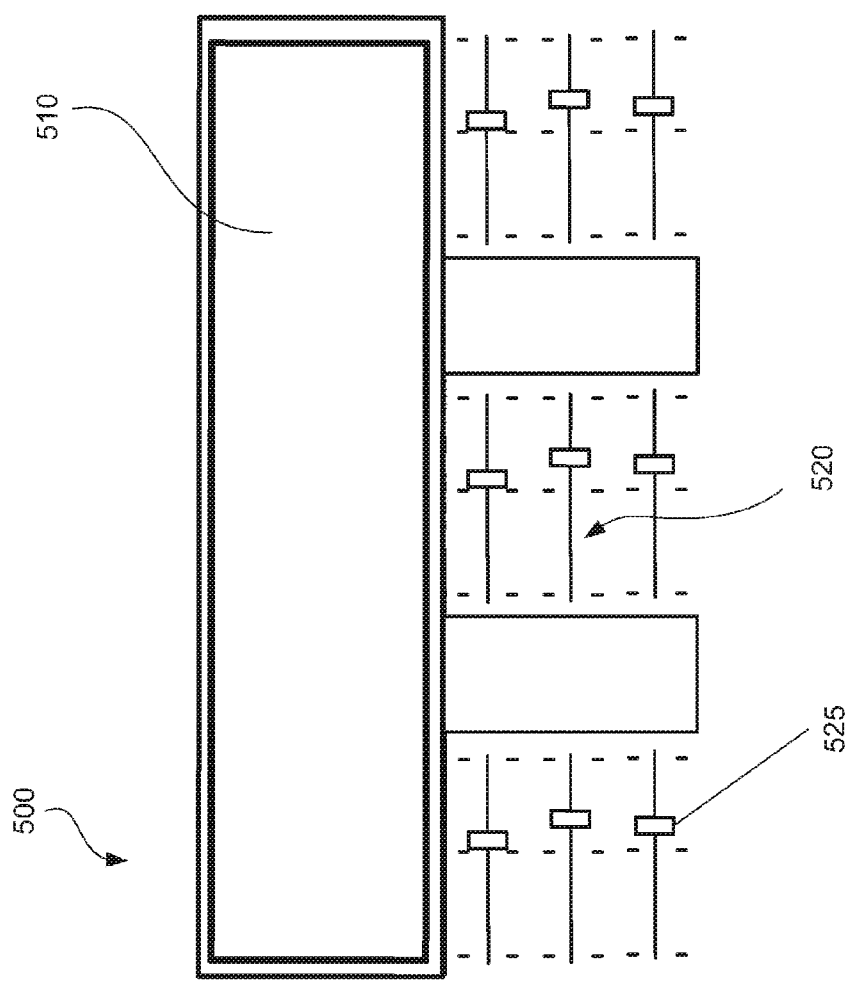
FIG. 5 depicts a view of a pilot touch screen according to an exemplary embodiment of the present disclosure.

In one embodiment as shown in FIG. 5, the touch screen 500 may include at least a first display portion 510 for displaying status information. The touch screen 500 may include a second display portion 520 for displaying one or more buttons and/or dials for adjusting control inputs of the TTH. In one embodiment, slider dials 525 may be used to adjust the control inputs based on a fixed range of the control inputs. For example, a desired roll rate, pitch rate, or lateral motion acceleration may be altered by sliding a respective slider dial 525 on the touch screen.

In one embodiment, one of the first display portion 510 and the second display portion 520 may be configured to display an elevation, a forward speed, a lateral speed, a bottom camera view, GIS location information, distance from an origin, distance to a destination, an altitude indicator, a time clock, and/or flight time. The other of the first display portion 510 and the second display portion 520 may be configured to display an odometer, a fuel/battery status, GPS location, an outside temperature, RPMs for each of the two rotors, tilt and pitch angles for each of the two rotors, roll and pitch angles, a rate of fuel consumption, and/or total power in percentage %.

In one embodiment, other information may be displayed on one of the first display portion 510 and the second display portion 520. This information may include a total flight time of the air vehicle, number of trips, and maintenance related information or schedules. In one embodiment, the touch screen 500 may include warning/alarm displays. The warning/alarm displays may output faults relating to any of the two motors, faults relating to any of the tilting servos, fuel or battery warnings, and inertial measurement unit (IMU) errors. In one embodiment, the touch screen 500 may include other nominal aircraft controls for a main power on/off, a front light, a beacon light, a cabinet light, door control/status, windows, a rescue elevator control panel, and/or communication instruments.

In one exemplary mode of operation, the pilot control panel 400 may, in response to the pilot's action, generate a command signal proportional to the pilot's action. For example, the position of joysticks 401, 402 may generate a signal $s_{min} \leq s \leq s_{max}$. The value of the signal limits may be fixed and standardized in avionic instrumentation. For the purpose of the subsequent discussion, the signal s is taken to be normalized to take values between 0 and 1. The normalized command signals from the control panel will be referenced using the hat symbol above the letter, e.g., $\hat{s}$. Each command signal corresponds to some desired air vehicle motion state, such as velocity, acceleration, rotational angle, or rotational angular velocity. The mapping between the electrical signal and the desired vehicle state may be performed by a filter in a flight quality filter bank 604 in FIG. 6. To illustrate this concept in one non-limiting embodiment, let the right joystick 401 command signal be $\hat{s} = \hat{\dot{y}}_d$, corresponding to a desired lateral speed of $\dot{y}_d$ in engineering units (e.g., meters/sec). The desired lateral speed can then be expressed (by way of example) as $$\frac{\dot{y}_d}{\hat{\dot{y}}_d} = H(s) = \frac{K}{\tau s + 1}.$$

Figure 9:
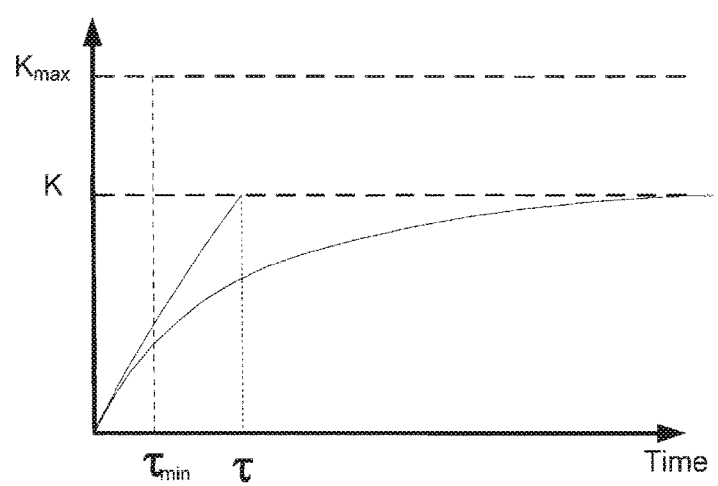
FIG. 9 depicts an exemplary response of flight quality filters according to an exemplary embodiment of the present disclosure.

H(s) is a flight quality filter and the response of this example filter is shown in FIG. 9.

Referring to FIG. 9, $K_{min}$, and $\tau_{min}$ are the operating limits of the aircraft or the safe limits for a human pilot. $K_{max}$ in this case represents the maximum lateral speed, while $\tau$ determines the rate of change of speed. The operating parameters K and $\tau$ may be set by the operator using the touch screen 500 in FIG. 5. For example, in combat operations, these parameters may be set to their limits $K=K_{max}$ and $\tau=\tau_{min}$, while in a pick-and-place mission, K may be selected to limit the lateral speed range to a few meters/sec, and $\tau$ to 5-10 seconds.

A separate filter may be provided for each operator command, and each of these filters may be characterized by two parameters, with ($K_{max}$, $\tau_{min}$) being constants for each aircraft, and operating parameters (K, $\tau$) being set by the pilot using the touch screen 500, or may be preset for a particular mission.

The output from the flight control filters may include set-points for the air vehicle control system which determine the thrust of each motor and tilting angles of each rotor. In one embodiment, the touch screen 500 may display and/or control one or more of the following: a mission selection dialog; a current mission mode; an elevation control/ascending speed control; an ascending control (K, $\tau$); an elevation (K, $\tau$); a yaw control (K, $\tau$); a pitch control (K, $\tau$); a roll control (K, $\tau$); an autopilot dialog (on/off, destination selection, arrival time); a forward speed (K, $\tau$); and a forward acceleration in thrust mode (K, $\tau$).

In one embodiment, the touch screen 500 may enable the pilot to limit a range of vehicle speed that can be reached by a full span of the joystick. In one exemplary pick-and-place mission to precisely install bridge construction parts, the range of speed control by the joystick may be limited to 1 or 2 meters/sec for precise motion and control of the air vehicle. Similarly, the pilot may set limits on the vehicle forward acceleration for specific missions. The setup may be saved and retrieved again in the future when the pilot starts similar missions.

In one embodiment, the touch screen 500 may enable the pilot to set up limits on lateral speeds and lateral accelerations for particular missions. Similarly, the pilot may set ranges for the controls performed by control panel 400 and accelerations for elevation, pitch control, yaw control, and roll control. As mentioned, the pilot may save a setup corresponding to a particular mission and retrieve the setup file when the pilot starts a similar mission.

In one embodiment, the aircraft may be provided with recommended manufacture configuration files for common flight missions. These common flight missions may include: training, transportation, combat, severe weather, rescue, pick-and-place, autopilot, limited tilt (if one or more tilting servos fail), emergency landing, user defined 1 (based on a first user defined configuration), and user defined 2 (based on a second user defined configuration).

In one embodiment, the severe weather configuration may be used and the objective of this configuration would be to maintain stability of aircraft and avoid a loss of elevation. However, maintaining a desired forward speed or a desired mission path in this configuration may be compromised.

In one embodiment, the pick-and-place configuration may set precise positioning, trim velocities, and orientation as the main objectives, while limiting travel distance and speed. On the other hand, during combat, the combat configuration may be used to set high maneuverability and acceleration controls as the main control objectives.

In one embodiment, the autopilot configuration may be selected. The user may then input desired destination coordinates (possibly with the aid of GIS or a map), desired elevation, and target arrival time using the touch screen 500. The auto pilot configuration may be configured to maintain desired travel conditions while displaying a remaining distance to the destination and the remaining time. The pilot may turn off the autopilot configuration at any time by touching a button on the touch screen 500.

In one embodiment, an emergency landing may be performed if one rotor fails and the TTH is left with only three control parameters: the motor thrust and two tilt angles. It is assumed that the one rotor has sufficient thrust to keep the aircraft at least in a hover state. In this emergency mode, the right joystick 401 may provide a direct control over the two tilt angles of the functioning rotor. A thrust lever may be used to control the power of the functioning rotor.

The purpose of the emergency mode is to provide safe landing, which may be accomplished in two steps. In the first step, the objective is to maintain a safe elevation and to direct the aircraft to a safe location for landing. The aircraft may be spinning and/or tilted. The pilot may use his/her judgment to select between a tolerable spinning and steerability of the aircraft. In the second step, once a safe spot for landing is reached, the objective is to stop spinning and minimize tilting of the aircraft to enable safe landing.

The exemplary chart in FIG. 8C illustrates the superior capability of a TTH that may operate with six control inputs. For example, a forward motion may be executed, using the tilt angles $\beta_1$ and $\beta_2$, without introducing any rotational movements of the TTH. Yaw movement with various angular speeds may be executed without any coupling with the roll or pitch. Similarly, the air vehicle may pitch in hover to aim at a ground target, or move laterally while maintaining a pitch or roll angle.

Figure 6:
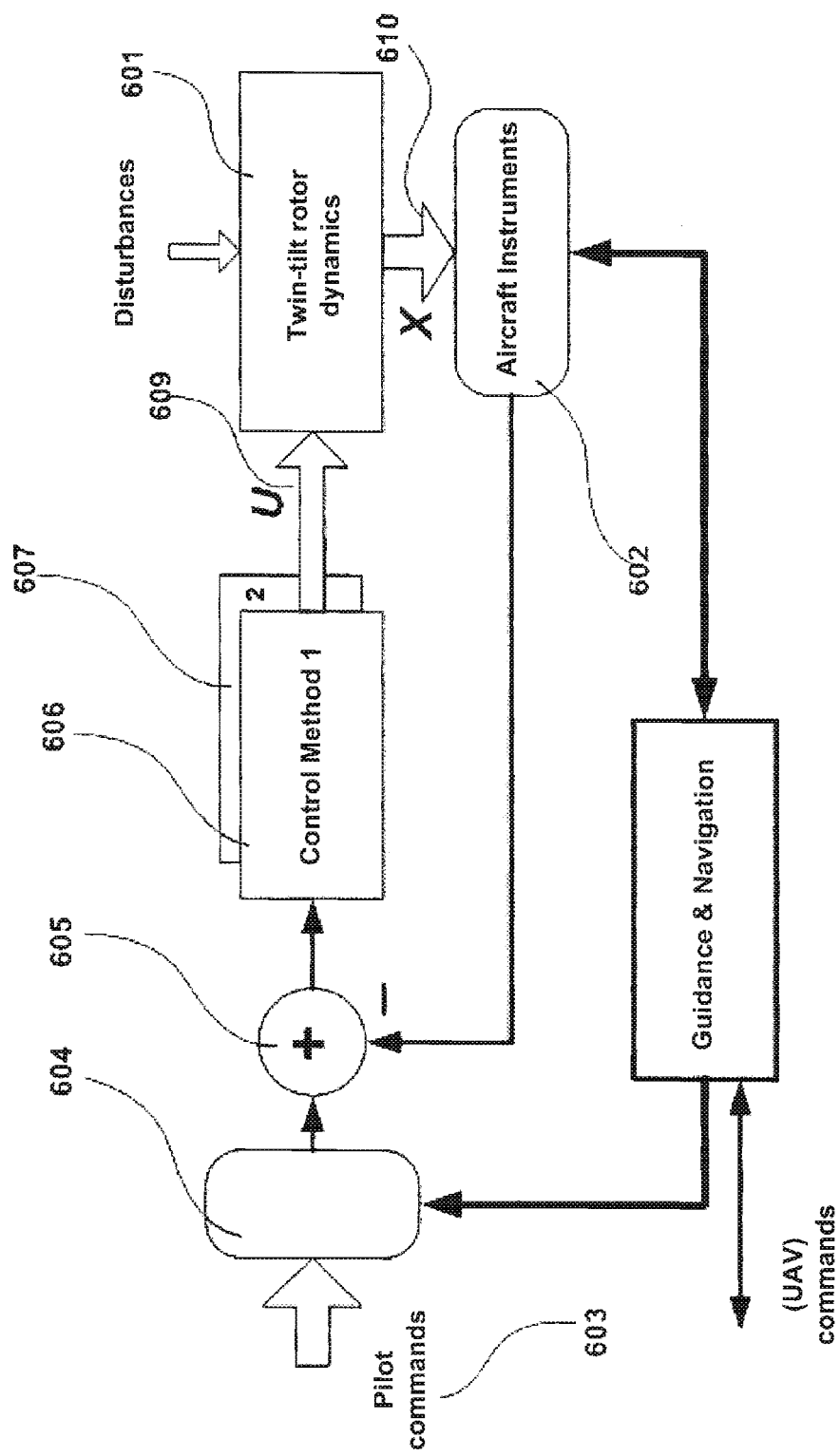
FIG. 6 depicts a flow chart of an exemplary control program according to an exemplary embodiment of the present disclosure.

A control procedure and method of mapping the desired pilot commands to appropriate control actions will now be discussed. In one embodiment as shown in FIG. 6, the dynamics of the twin-tilt rotor 601 is measured by on-board aircraft instruments 602, a measurement vector X 610 is then compared with desired values in a comparator 605. The comparator 605 also calculates an error, which is a difference between the desired and measured states of the air vehicle. The error is then used by one of the control methods to produce a control vector U 609. A first control method 606 may be a default method. While, a second method 607 may be used in case of failure of rotor 2 or 1.

In one embodiment, other control methods may also be switched on based on the mission or the pilot choice. For example, the pilot may change from a speed control to a thrust mode if the pilot or operator wants to accelerate without deciding a desired final speed or level. The pilot may also set a cruise control (autopilot) to maintain flight states at a desired condition. Commands from the control panel may first be filtered by a set of flight quality filters to ensure the rate of changes are within a human and an equipment endurance and safety limits, and interlock conflicting commands.

Next, exemplary embodiments of control methods will be discussed:

a) A control method for elevation where the elevation lever 403, as shown in FIG. 4, is set to a desired elevation $Z_d$:

$$e_z(t) = z_d - z(t)$$

$$F_1 = F_2 = K_{p1}e_z(t) + K_{I1}\int_0^t e_z(t)dt + K_d\frac{de_z(t)}{dt}$$

The pilot may switch control to the speed (thrust mode), where the pilot would have direct control over an ascending/descending speed of the air vehicle. The switching between elevation control and ascending speed control may be performed by the touch screen 500 or by a switch on the elevation lever 403.

b) A control method for forward velocity where the right joystick 401 is set to a desired forward velocity $\dot{x}_d$ $$e_x(t) = \dot{x}_d - \dot{x}$$

$$\alpha_1 = \alpha_2 = 0°$$

$$\beta_1 = \beta_2 = K_{p2}e_x(t) + K_{I2}\int_0^t e_x(t)dt + K_{d2}\frac{de_x(t)}{dt}$$

c) A control method for lateral velocity where the right joystick 401 is set to a desired lateral velocity $\dot{y}_d$ $$e_y(t) = \dot{y}_d - \dot{y}$$

$$\alpha_1 = \alpha_2 = K_{p3}e_y(t) + K_{I3}\int_0^t e_y(t)dt + K_{d3}\frac{de_y(t)}{dt}.$$

If a rotor for forward and lateral speed control is used, the combined tilt angles would be $$\sin(\alpha) = \sqrt{u_1^2 + u_2^2}$$

$$\sin(\beta) = \frac{u_2}{\sqrt{u_1^2 + u_2^2}}$$

where $u_1$ and $u_2$ are the controller outputs corresponding to the forward velocity and lateral velocity, respectively.

d) A control method for yaw rotation where the left joystick 402 is twisted to set the desired yaw rotation rate $\dot{\psi}_d$ $$e_\psi(t) = \dot{\psi}_d - \dot{\psi}(t)$$

$$\Delta\alpha_1 = -\Delta\alpha_2 = K_{p4}e_\psi(t) + K_{I4}\int_0^t e_\psi(t)dt$$

e) A control method for pitch where the left joystick 402 is pushed forward/backward to set a desired pitch angle $\theta_d$ $$e_\theta(t) = \theta_d - \theta(t)$$

$$\Delta F_1 = -\Delta F_2 = K_{p5}e_\theta(t) + K_{I5}\int_0^t e_\theta(t)dt$$

f) A control method for roll where the left joystick 402 is pushed right/left to set a desired roll angle $\phi_d$ $$e_\phi(t) = \phi_d - \phi(t)$$

$$\Delta\beta_1 = -\Delta\beta_2 = K_{p6}e_\phi(t) + K_{I6}\int_0^t e_\phi(t)dt$$

The above algorithms are exemplary embodiments for illustration only. Other efficient and robust versions of the algorithms known in the art may be applied based on the exemplary embodiments by those skilled in the art. Additionally, other powerful, but computationally demanding versions, of the algorithms may be designed and applied by those skilled in the art based on the exemplary embodiments discussed in the present disclosure.

Figure 7:
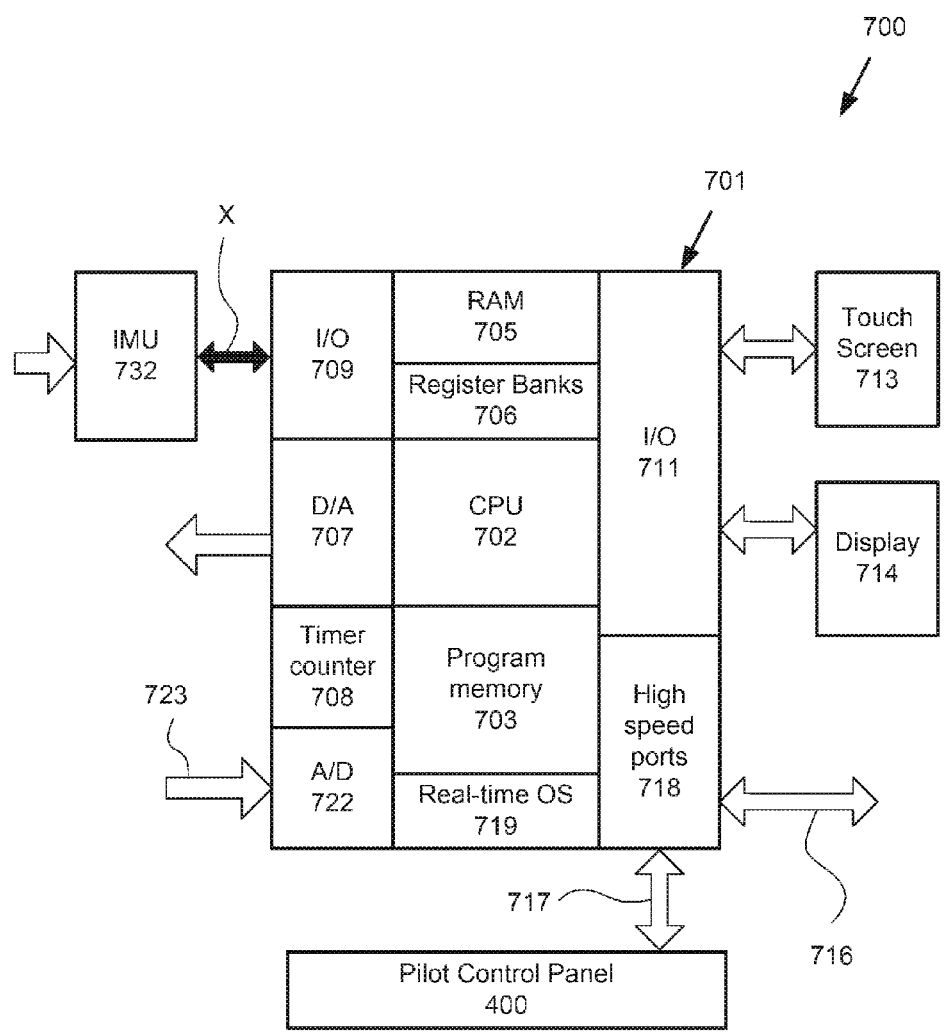
FIG. 7 depicts a block diagram of an exemplary flight computer according to an exemplary embodiment of the present disclosure.

FIG. 7 depicts a block diagram of an exemplary flight computer 700 according to an exemplary embodiment of the present disclosure. In one embodiment, a central processing core 701 may be provided to interact with one or more touch screens 713 (e.g., touch screens 405 and 500 in the present disclosure), one or more display screens 714 (e.g., the display screens 406 and 407 in the present disclosure), a pilot control panel 400, one or more sensors 723, and inertial measurement unit (IMU) 732. The central processing core may send commands to servos and/or actuators of the TTH having six total control inputs.

In one embodiment, the center processing core 701 of the flight computer 700 may be a high performance microcontroller with an on-chip serial communion unit. A CPU 702 of the center processing core 701 may fetch instructions sequentially from a program memory 703 and execute them. The program memory 703 may store detailed computational steps as outlined in FIGS. 8A and 8B.

The results of execution may be stored temporarily in one or more banks of general purpose registers such as register banks 706. A real-time operating system 719 may manage the execution of various tasks, and allocates RAM memories, board resources, and CPU time according to execution priorities of various tasks. A RAM 705 may store various measurements, their respective scaled values, and their processed and transformed values. The RAM 705 may consist of volatile and non-volatile parts. The non-volatile part of the RAM 705 may store the configuration parameters and the setup parameters, the accumulated values, and the identified values. The volatile part of the RAM 705 may store the current values, status values, and limited historical values for periodic reporting to a host computer if needed.

Examples of values stored in the non-volatile part of the RAM 705 may include: all the measured values, alarms, and pilot commands (required for maintenance, diagnostics, accidents investigation); air vehicle limits ($K_{min}$, $\tau_{min}$) for all commands; operational limits (K, $\tau$) during flight (set by an operator or by a mission file); total traveled distance; trip distance; destination location/distance to destination; operating hours of the air vehicle; number of air vehicle trips; total operating hours of the air vehicle; missions files; and/or GIS maps.

Examples of values stored in the volatile part of the RAM memory 705 may include: elevation; forward speed; lateral speed; GIS location; distance from origin/distance to destination; attitude indicator (pitch and roll angles); fuel/battery status; GPS location; outside temperature; RPMs of the two rotors; roll/pitch angle; rate of fuel consumption/total power %; and/or tilt angles of each rotor.

In one embodiment, the execution timing may be determined by a master CPU clock oscillator such as a timer counter 708, which may include a special watch-dog timer that produces an alarm and initiates a special reset sequence if the CPU 702 halts for one reason or another. If the board malfunctions, a signal is automatically generated to switch the board to a backup (redundant) board. The timer counter 708 contains a number of programmable digital counters which can be programmed to provide time delays and timing sequences for sampling and for execution of other program fragments. The IMU 732 provides the flight measurement vector X at a specified sampling rate. The IMU 732 includes various flight sensors such as accelerometers, gyros, a GPS, a compass, and an elevation radar.

In one embodiment, the CPU 702 may internally be connected to a number of digital input/output registers such as the register banks 706 which may interface with external devices via digital I/O channels 709 and 711. The I/O digital channels 711 may be connected to a touch screen 713, which may allow the pilot or operator to initialize operating parameters, configure the software for particular flow characteristics, and for testing and maintenance purpose. The digital I/O channels 711 may interface a control board including the CPU 702 to one or more display 714. The display 714 may display status parameters, operating modes, values invoked by the operator, error messages, and measured values.

In one embodiment, measured and calculated values may be communicated wirelessly, during an online mode, at a regular rate to a remote host computer via high speed ports 718, and high speed communication links 716. The pilot control panel 400 is illustrated in FIG. 4. The control board may comprise a plurality of digital to analog (D/A) channels 707 which may be used to send control commands to various on-board actuators and servo systems, including the two main rotors, and four servo actuators, which may align the rotors to desired tilt angles. An analog to digital (A/D) converter 722 may provide interfaces to various flight sensors, as temperature sensors, battery status, fuel gauges, servos position measurements, hydraulic pressure, etc.

Turning to procedural steps, an exemplary method for controlling the TTH including up to six total control inputs is shown in FIGS. 3 and 8A-8C. In one embodiment, execution of all the steps is typically repeated at each sampling period. The sampling rate may be determined by the user depending on the size of the TTH, and the dynamic response time of the TTH.

With respect to fault tolerance, the control method for the TTH with up to six total control inputs may be operated using different modes. The TTH's motion states of interest to pilot control of the aircraft may include: { $\dot{x}$ , $\ddot{x}$ , $\dot{y}$ , $\ddot{y}$ , z, $\dot{z}$ , $\theta$ , $\dot{\phi}$ , $\phi$ , $\dot{\theta}$ , $\dot{\psi}$ , $\ddot{\psi}$ }, which correspond to: a forward speed, a forward acceleration, a lateral speed, a lateral acceleration, an elevation, an ascending speed, a pitch angle, a rate of change of pitch angle, a roll angle, a rate of change of roll angle, a yaw angular velocity, and a yaw angular acceleration. In one embodiment, the six control parameters enable the pilot to have independent control over each of the above TTH motion states. The six control parameters may include {$\omega_1, \omega_2, \alpha_1, \beta_1, \alpha_2, \beta_2$}, where {$\omega_1, \omega_2$} are angular speeds of the two rotors, and the rest of the parameters correspond to tilt angles of the two rotors. The TTH may operate under several modes in case of failure of one or more rotors and/or tilting servo systems.

Figure 8A:
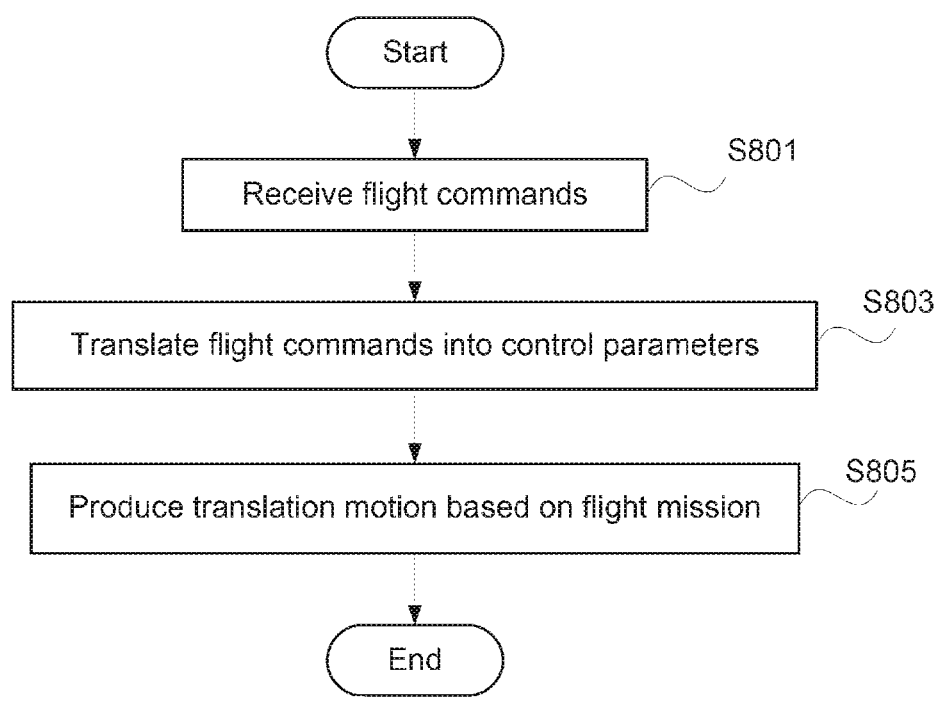
FIG. 8A depicts a flow chart for operating the twin-tilt rotor air vehicle according to an exemplary embodiment of the present disclosure.

FIG. 8A depicts a flow chart for operating the twin-tilt rotor air vehicle according to an exemplary embodiment of the present disclosure. The process starts when the pilot control panel 400 issues operator inputs or the flight instrumentation detects a malfunction in a rotor. In step S801, the flight computer 700 receives flight commands from the pilot control panel 400. The flight commands can be input as discussed with respect to FIGS. 4 and 5. For example, the right joystick 401 may be used by a pilot or an operator to control the forward speed by moving the joystick forward and backward, and lateral speed may be controlled by moving the right joystick 401 horizontally left and right, while the forward acceleration, or thrust, may be controlled by twisting the right joystick 401. On the other hand, with the left joystick 402, the forward/backward position may be used to control the pitch of the air vehicle, the left/right positions may be used to control the roll of the air vehicle, while twisting the left joystick 402 may control the yaw angular velocity.

In step S803, the flight commands are translated into control parameters. For example, each joystick motion such as forward, backward, left right, etc. can be associated with one of the six control parameters $\{\omega_1,\omega_2,\alpha_1,\beta_1,\alpha_2,\beta_2\}$. The flight commands from the pilot control panel 400 or 500 are input to the control methods, which calculate the control parameter such as the angle of tilt of one or more rotor. Sample flight commands and corresponding control parameters are illustrated in FIG. 8C. The control methods can be stored in the program memory 703 of the flight computer 700.

Furthermore, in step S805, the flight computer 700 can produce translation motions and orientation commands based on the flight mission programmed in the program memory 703. For example, flight missions may include: training, transportation, combat, severe weather, rescue, pick-and-place, autopilot, limited tilt (if one or more tilting servos fail), emergency landing, user defined 1 (based on a first user defined configuration), and user defined 2 (based on a second user defined configuration). Each flight mission may set limits on control parameters, as discussed with respect to FIG. 9 earlier in the disclosure. For example, in combat operations, parameters may be set to their limits $K=K_{max}$ and $\tau=\tau_{min}$, while in a pick-and-place mission, K may be selected to limit the lateral speed range to a few meters/sec, and $\tau$ to 5-10 seconds. Further, the flight computer can store different modes of operation based on the condition of the rotor and can change from a first operating mode to a second operating mode as the rotor condition changes, as discussed with respect to FIG. 8B.

In one embodiment, a first mode may be a normal mode where there are two fully functional rotors and all six control parameters $\{\omega_1,\omega_2,\alpha_1,\beta_1,\alpha_2,\beta_2\}$ may be available to the pilot. However, if either the left rotor, or the right rotor fails, a second mode may be activated where the available control parameters are reduced, for example, the available parameters can be $\{\omega_1,\alpha_1,\beta_1\}$ and the pilot would have limited capabilities over six TTH motion states, which may include $\{\ddot{x},\ddot{y},z,\theta,\phi,\dot{\psi}\}$. Performance may be reduced as necessary for the conditions in the second mode.

In one embodiment, if the servo system for one or two of the two rotors 1 and 2 fail, (e.g., if servo motors for one rotor $\{\alpha_1,\beta_1\}$ fail) a third mode may be activated. In the third mode, the available control parameters may include $\{(\omega_1,\omega_2,\alpha_2,\beta_2\}$, and the pilot would have limited capabilities over ten TTH motion states with possible coupling between them. The ten TTH motion states may include $\{\ddot{x},\ddot{y},\ddot{z},z,\ddot{z},\theta,\phi,\dot{\phi},\dot{\psi},\ddot{\psi}\}$.

In one embodiment, if the servo systems for both the rotors 1 and 2 fail, a fourth mode may be activated. In the fourth mode, the available control parameters may include $\{\omega_1,\omega_2\}$, and the pilot would have limited capabilities over only four TTH motion states with possible coupling between them. The four TTH motion states may include $\{\ddot{x},z,\theta,\dot{\psi}\}$ or $\{\ddot{x},\ddot{y},z,\dot{\psi}\}$.

Figure 8B:
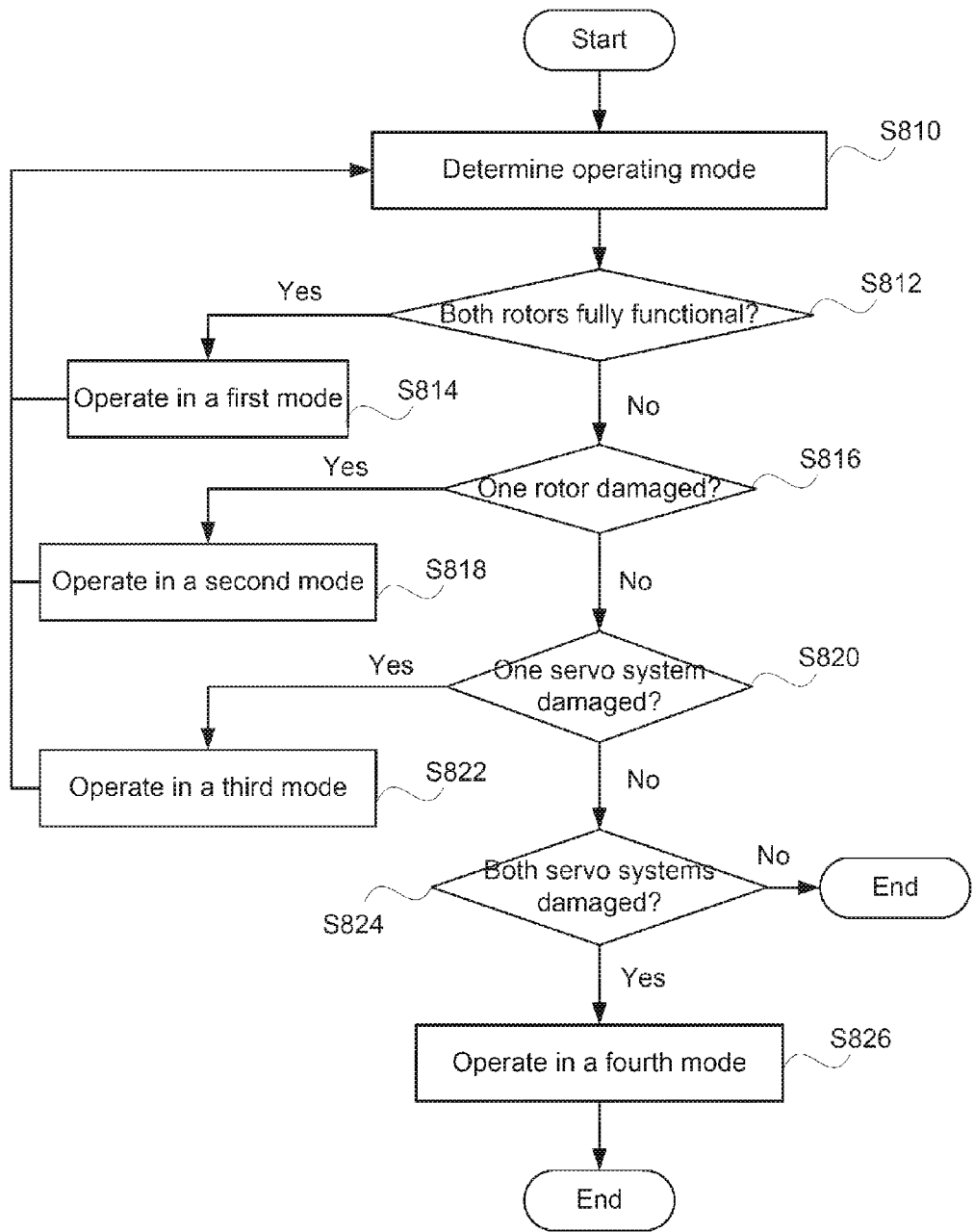
FIG. 8B depicts a flow chart for switching different modes of operation of the twin-tilt rotor air vehicle according to an exemplary embodiment of the present disclosure.

FIG. 8B depicts a flow chart for switching between different modes of operation of the twin-tilt rotor air vehicle according to an exemplary embodiment of the present disclosure. The process starts when the flight computer is turned on and flight instrumentation sends signal to the flight computer. In step S810, an operating mode (the first, second, third or fourth operating mode, as discussed above), is dynamically determined using the flight instrumentation data. The flight instrumentation can include sensors or a software program that detects the condition of the rotors 1 and 2 and the four servo mechanisms in real-time.

In step S812, a determination is made based on the inputs from the flight instrumentation whether both the rotors 1 and 2 are fully functional. If fully functional, then the first mode (step S814) of operation is activated allowing control of all six control parameters. If not, step S816 is executed.

In step S816, a determination is made a determination is made based on the inputs from the flight instrumentation whether one of the rotors 1 and 2 is damaged or failed using inputs from the flight instrumentation. If damage is detected, then the second mode of operation is activated allowing control of less than six control parameters, in step S818. If not, step S820 is executed.

In step S820, a determination is made if one of servo systems of the rotors 1 or 2 is damaged or failed using the flight instrumentation. If damage is detected, then the third mode of operation is activated, in step S822. If not, step S824 is executed.

In step S824, a determination is made if both the servo systems of the rotors 1 and 2 are damaged or failed using the flight instrumentation. If damage to both servo systems is detected, then the fourth mode of operation is activated, in step S826.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosure. For example, this technology may be structured for cloud computing whereby a single function is shared and processed in collaboration among a plurality of apparatuses via a network.

What is claimed is:

1. A twin-tilt rotor air vehicle system comprising:
an air vehicle;
a flight computer;
a fuselage mounted on a post mounted to a top of the air vehicle above the air vehicle's center of gravity and extending symmetrically and laterally from the air vehicle, and perpendicular to a roll axis of the air vehicle, and
two rotors symmetrically mounted to opposite ends and at an underside of the fuselage, each of the two rotors including a servo mechanism to tilt a respective rotor of the two rotors about two axes of the respective rotor, one of the two axes is collinear with the pitch axis of the air vehicle system, each servo mechanism having a rotor base that extends through the fuselage, wherein the fuselage is further secured to the air vehicle with two struts, each strut connected at a bottom side of the fuselage at a position that is the same distance from the roll axis as the servo mechanisms and a bottom of the post mounted to the top of the air vehicle, wherein the flight computer sends control parameters to each of the two rotors, the control parameters including a rotational speed, a first tilt angle about a first axis of the two axes of the respective rotor, and a second tilt angle about a second axis of the two axes of the respective rotor, and wherein in two rotors are the only rotors included in the twin-tilt rotor air vehicle system.

2. The air vehicle system according to claim 1, wherein each of the two rotors is independently tillable about the first axis and the second axis of the respective rotor.

3. The air vehicle system according to claim 1, further comprising:

a control panel, wherein
the control panel sends flight commands, and
the flight commands are executed by the flight computer to control the control parameters of the two rotors.

4. The air vehicle system according to claim 3, wherein the control panel includes at least two 3-axis joysticks, the at least two 3-axis joysticks include a first joystick and a second joystick, forward and reverse positions of the first joystick are proportionally linked to forward and reverse speeds of the air vehicle, left and right positions of the first joystick are proportionally linked to a lateral speed of the air vehicle, and a twist of the first joystick is proportionally linked to forward acceleration or forward thrust of the air vehicle.

5. The air vehicle system according to claim 4, wherein forward and reverse positions of the second, joystick are proportionally linked to a pitch angle of the air vehicle, left and right positions of the second joystick are proportionally linked to a roll angle of the air vehicle, and a twist of the second joystick is proportionally linked to a yaw angular velocity of the air vehicle, and a twist of the second joystick is proportionally linked to a yaw angular velocity of the air vehicle.

6. The air vehicle system according to claim 5, wherein the control panel further includes switches to alter the proportionally linked functions assigned to the first joystick and the second joystick.

7. The air vehicle according to claim 3, wherein the control panel includes a first sliding stick and a second sliding stick, the first sliding stick is linked to an elevation control of the air vehicle, and the second sliding stick is linked to a speed of ascending and descending of the air vehicle.

8. The air vehicle system according to claim 3, wherein the control panel includes control inputs to set a lateral acceleration, a roll angular speed, a pitch angular speed, and a yaw acceleration of the air vehicle.

9. The air vehicle according to claim 3, wherein the control panel receives the flight commands from a location remote from the air vehicle.

* * * * *